United States Patent [19]
Jeffers et al.

[11] Patent Number: 5,931,519
[45] Date of Patent: Aug. 3, 1999

[54] 5TH WHEEL TRUCK TAILGATE, ITS MANUFACTURE AND USES THEREOF

[75] Inventors: Desmond T. Jeffers, 751 Tregaskis Ave., Vallejo, Calif. 94591; James L. McKinlay, 178 Bayview Ave., Vallejo, Calif. 94590

[73] Assignees: Desmond T. Jeffers; James L. McKinlay, both of Martinez, Calif.

[21] Appl. No.: 08/553,967

[22] Filed: Nov. 6, 1995

[51] Int. Cl.⁶ ........................................................ B60P 7/04
[52] U.S. Cl. ........................ 296/57.1; 280/901; 280/423.1
[58] Field of Search ............................ 296/50, 51, 57.1; 280/423.1, 901

[56] References Cited

U.S. PATENT DOCUMENTS

| | | | |
|---|---|---|---|
| 4,669,748 | 6/1987 | LeVee | 280/423.1 |
| 5,303,947 | 4/1994 | Gerber | 296/57.1 X |
| 5,597,195 | 1/1997 | Meek | 296/57.1 X |

Primary Examiner—Joseph D. Pape

[57] ABSTRACT

An improved tailgate for allowing easy hook-up to 5th wheel trailers; recreational or horse-utility types by way of a drop down top center door incorporated into the tailgate. This allows a line of sight from the tow vehicle to the 5th wheel trailer through the hitching access path with which the hitch pin travels to engage the receiver hitch mounted in the pick-up truck box.

3 Claims, 4 Drawing Sheets

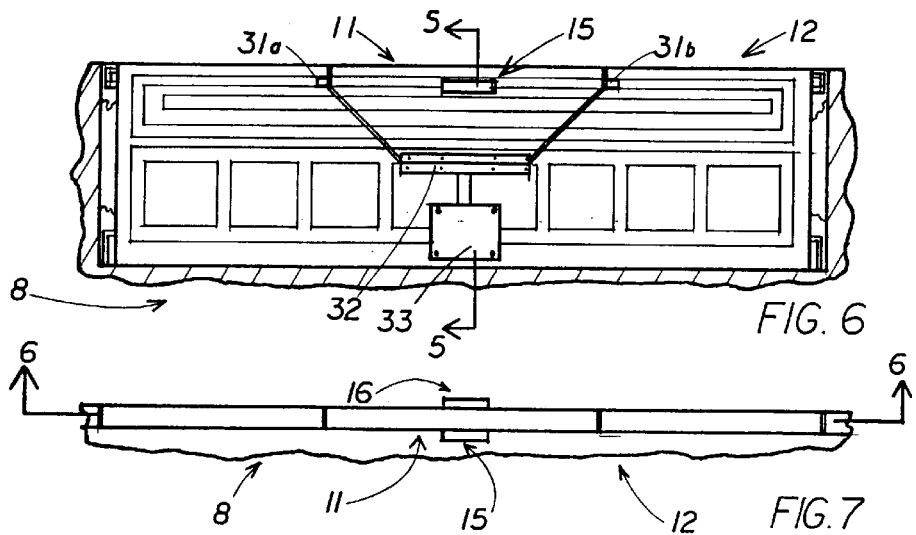
FIG. 6
FIG. 7
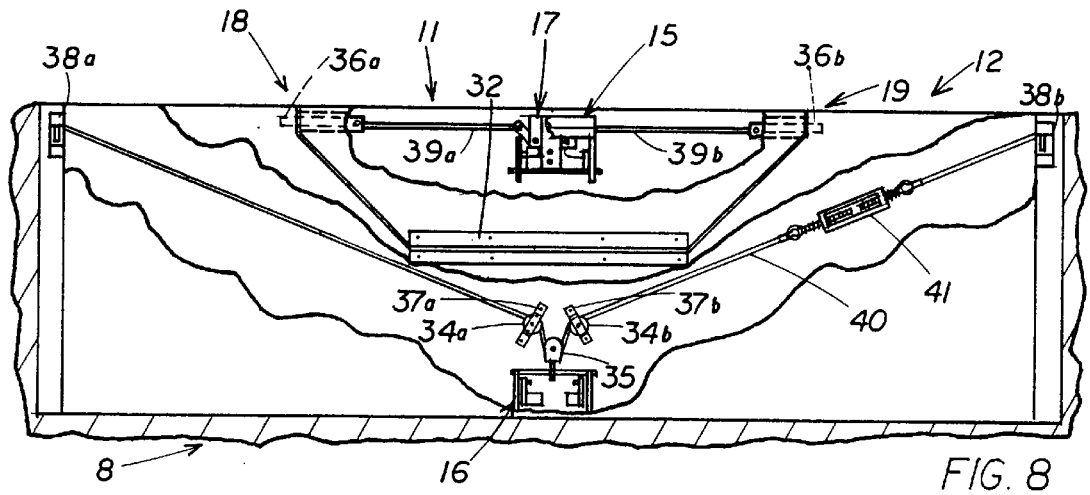
FIG. 8
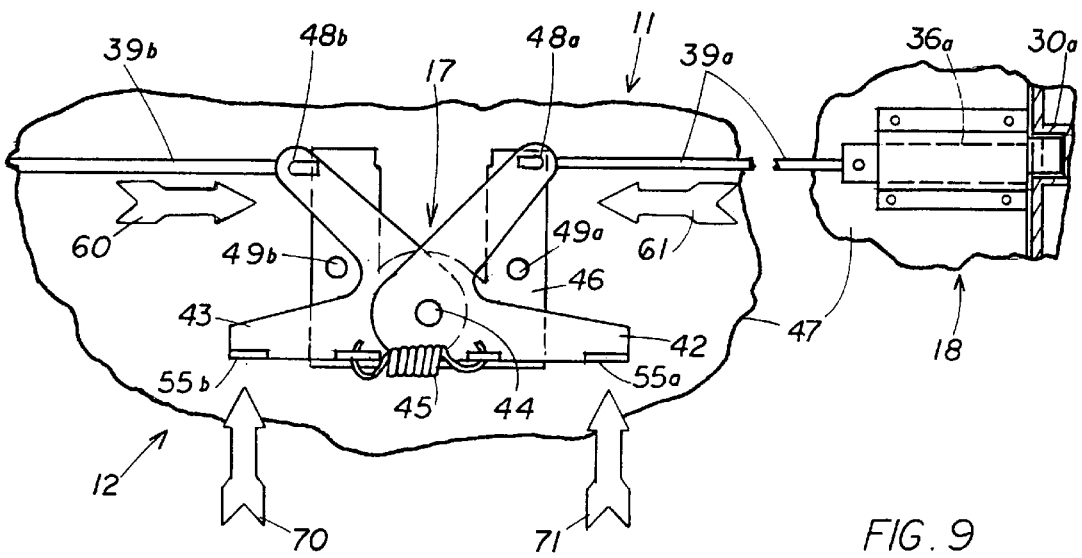
FIG. 9

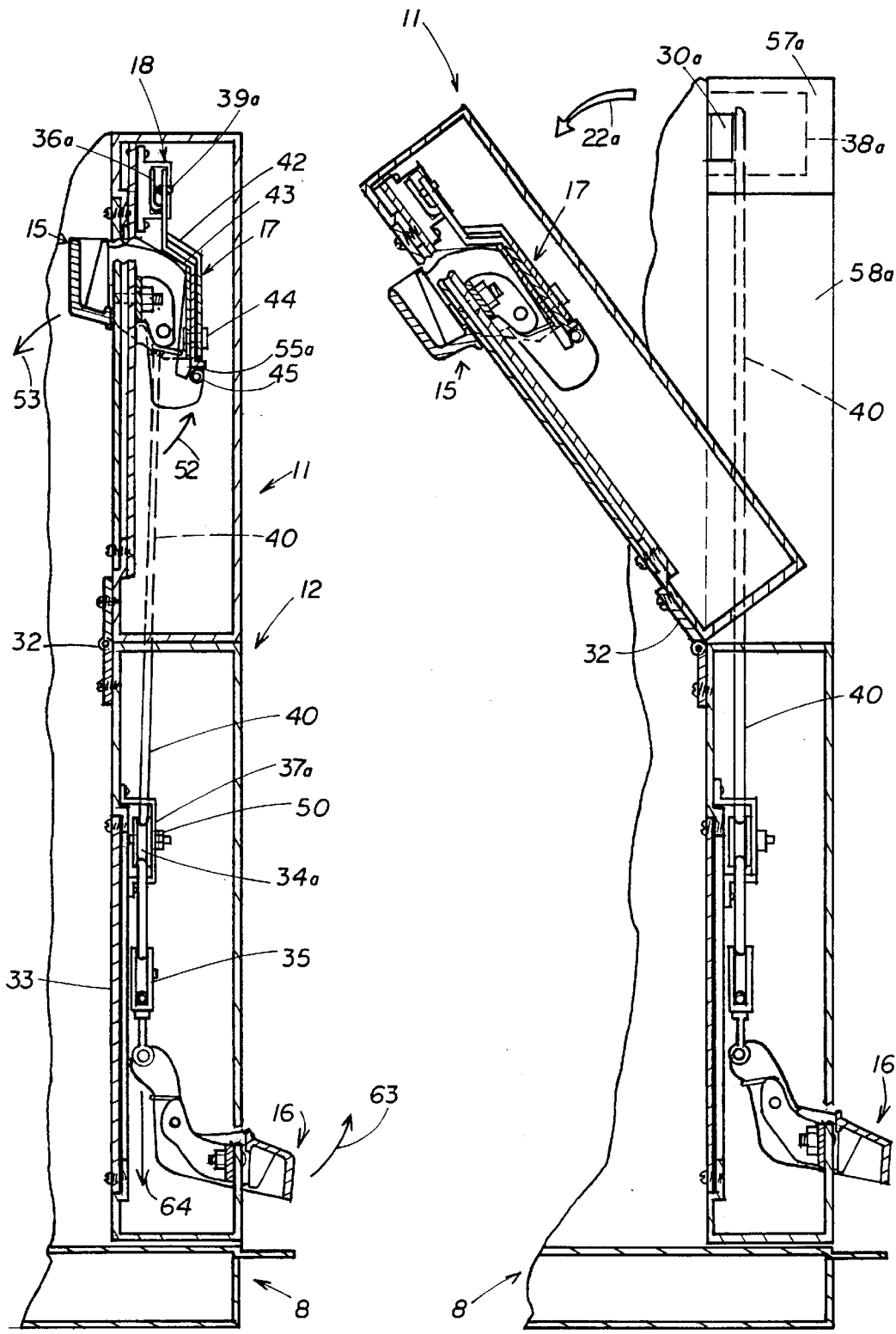

5TH WHEEL TRUCK TAILGATE, ITS MANUFACTURE AND USES THEREOF

BACKGROUND OF THE INVENTION

1. Field of the Invention

This invention relates generally to towing vehicles used for the purpose of towing 5th wheel trailers; recreational, horse or utility types.

2. Description of the Prior Art

5th wheel trailers are very popular forms of recreational vehicles used due to the increased size of living space per the overall length of the vehicle with the overhang portion of the trailer. To hook up a recreational vehicle of this type necessitates lowering of the tailgate of the pick-up truck towing vehicle so as to allow the hitch pin mounted to the tongue of the 5th wheel trailer to enter the pick-up truck box where the receiver hitch is mounted to the floor. When the hitch pin enters the pick-up box the tailgate must be closed so that the edge of the tailgate if left in the open position will not hit the front face of the trailer. Many after market designs are manufactured as replacements to eliminate this tailgate problem, but they are not true tailgates. The designs sold on the market now are wire screens with a metal frame to hold its shape or vane/louvered metal configurations with a notch in the center of them at the top portion so that the hitch pin of the 5th wheel trailer can pass through during hook-up or unhook operation. These designs are useful only in this purpose as there is no structural strength to them as is a factory tailgate for load carrying capabilities as our design described herein.

SUMMARY OF THE INVENTION

The present invention provides for an improved tailgate of design to allow easier hook-up to 5th wheel recreational type trailers by means of a drop down top center door incorporated into a tailgate. This allows the hitch pin of a 5th wheel trailer to enter the pick-up box where the receiver hitch is bolted to the floor. With the drop down top center door incorporated into the tailgate it eliminates the need to remove the standard tailgate, as many people do, or use the after market screen or vane type replacement tailgates which do not have the integral strength or the finish look.

BRIEF DESCRIPTION OF THE DRAWINGS

FIG. 6 is a plan view of the tailgate in the closed position;

FIG. 7 is an elevational view of the tailgate in the closed position;

FIG. 8 is a sectional view of the tailgate in the closed position showing the release arrangements for the drop down center door and the tailgate;

FIG. 9 is a breakaway view of the drop down center door latch release mechanism;

FIG. 10 is a sectional end view of the tailgate in the closed position; and

FIG. 11 is a sectional end view of the tailgate with the drop down center door being opened.

DETAILED DESCRIPTION OF THE INVENTION

Figure 1:
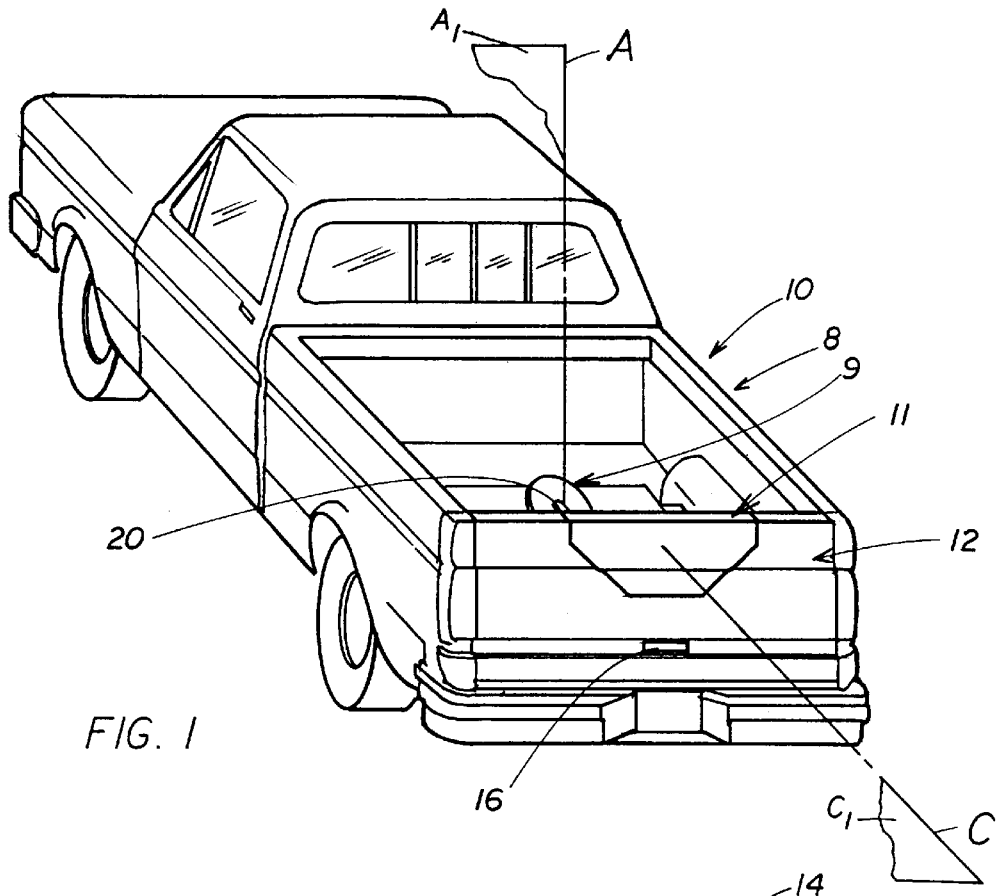
FIG. 1 is a perspective view of a pickup truck bed having a hitch receiver and a tailgate of the current invention.
Figure 2:
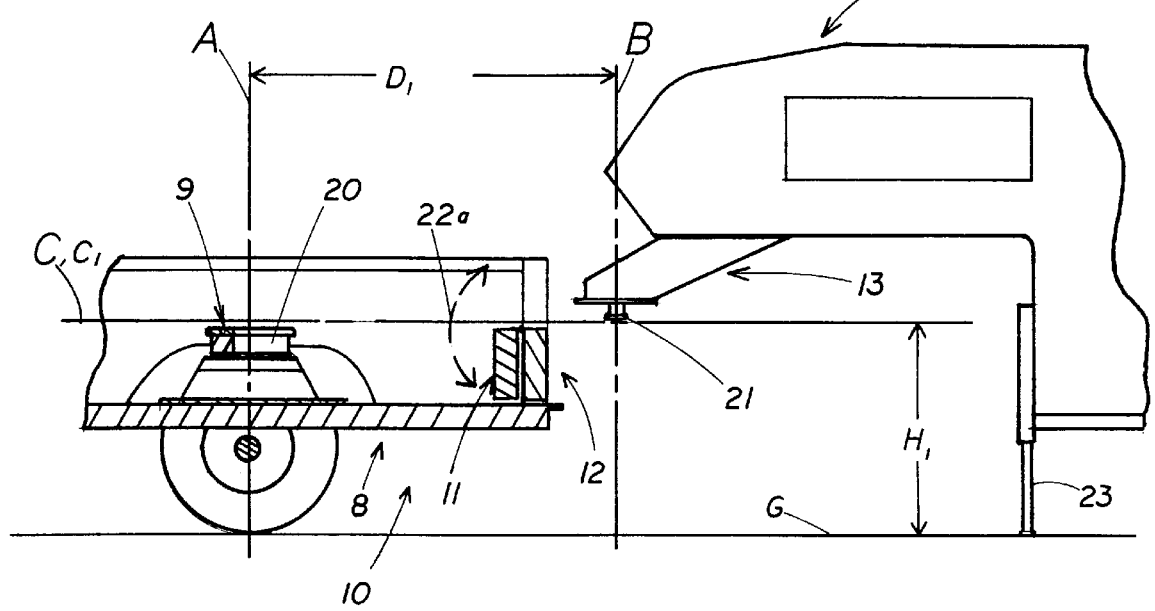
FIG. 2 is a side sectional view showing a fifth wheel trailer hitch aligned with the current invention.
Figure 3:
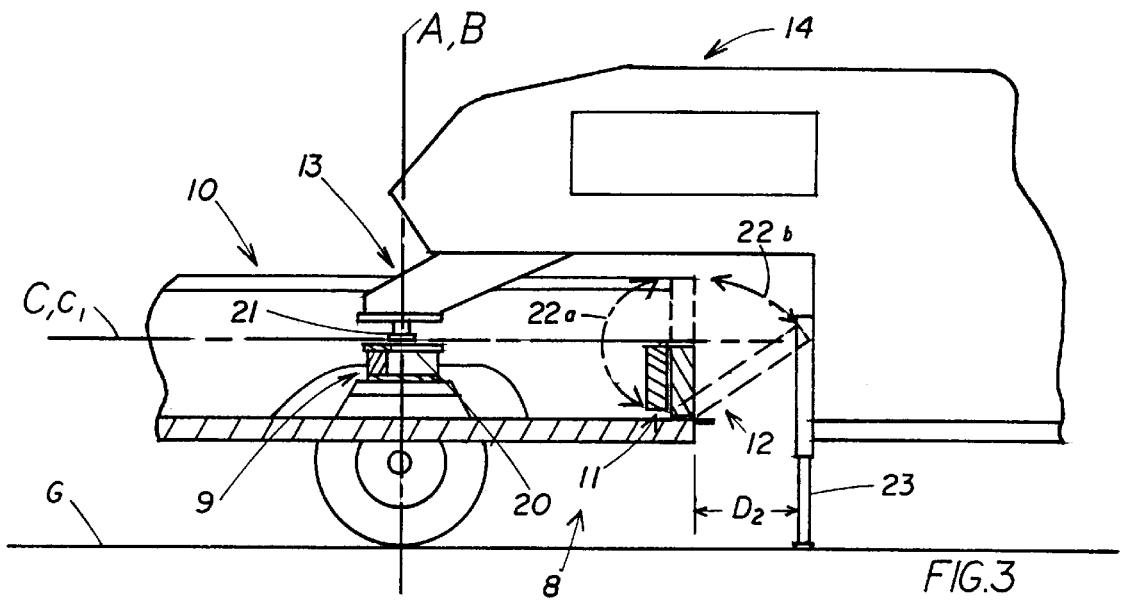
FIG. 3 is a side sectional view showing a fifth wheel trailer hitch connected with the current invention.

Drawings have like numerals throughout several views; FIG. 1 A perspective view of a pick-up truck illustrated at 10 with a pick-up box 8 of a pick-up truck with a 5th wheel receiver hitch 9 mounted in the bottom of the pick-up truck box 8, also shown is the horseshoe shaped receiver cutout 20 which accepts hitch pin 21 of a typical 5th wheel trailer to lock into for towing of the 5th wheel trailer 14. The pick-up truck tailgate 12 shows the modification applied for under this patent application and will be known as a drop down top center door 11. The drop down top center door 11 is shown in FIG. 1 as in the closed position the same as tailgate 12. Also shown is the relocated tailgate release handle 16 which was originally mounted in the area of the tailgate 12 which is now called the drop down top center door 11. The path with which a typical 5th wheel trailer tongue 13 of FIG. 2, must travel along to be hooked-up to a pick-up truck is shown in FIG. 1, FIG. 2, and FIG. 3, as C1-C, and meets at A1-A, the receiver hitch cutout 20 mounted in the pick-up box 8. This can be accomplished when the drop down top center door 11 is in the open position as in FIG. 2 and the 5th wheel trailer hitch pin 21 can pass through the opening of the drop down top center door 11 in the open position as in FIG. 2 and the 5th wheel trailer hitch pin 21 can pass through the opening of the drop down center door 11.

FIG. 2 is an offset view of a typical 5th wheel trailer showing the tongue 13 of the 5th wheel trailer 14 with the hitch pin 21 attached to the tongue 13. The drop down top center door 11 has been opened for the purpose of the 5th wheel trailer to be hooked-up. The drop down top center door 11 opening from tailgate 12 is shown in ARC 22a for illustration. The hitch pin 21 must be adjusted from ground level G to the visual level H1 which will allow hitch pin 21 to pass through opening created when drop down top center door 11 is in the open position FIG. 2 as 22a and illustrated in FIG. 5. Height adjustment for H1 is accomplished by cranking/turning to raise the stabilizing jacks 23 mounted to the front facing edge of the 5th wheel trailer 14. This allows H1 to be reached for height clearance so hitch pin 21 has clearance to pass through opening created with drop down top center door 11 in the open position along the path of travel C,C1 to enter into the horseshoe cutout 20 of receiver hitch 9 mounted to the bottom of the pick-up truck box 8. The receiver hitch 9 is mounted over the center of the rear axle housing of the pick-up truck 10 which allows the proper clearance of the trailer tongue 13 to travel along C,C1 to hook-up and is illustrated in FIG. 2 as D1. The distance the hitch pin 13 connected to the 5th wheel trailer tongue 13 travels along C,C1 represented as B, the center of hitch pin 13 to A, the center of the receiver hitch 9 mounted in pick-up truck box 8. When the hitch pin 13 engages into the horseshoe cutout 20 of the receiver hitch 9 lock-up is accomplished as signified by A, B of FIG. 3. In FIG. 3 for illustration purposes tailgate 12 is shown to be impossible to fully lower into the open position when 5th wheel trailer 14 is hooked up to the pick-up truck 10. Tailgate 12 is illustrated by broken lines to travel along ARC 22b being lowered into the open position and cannot be accomplished, as D2, the distance from the back of the pick-up truck 10 to the front face of the 5th wheel trailer 14, when the 5th wheel trailer 14 is hooked up to the pick-up truck 10 the distance, D2, is insufficient to allow the complete lowering of the tailgate 12, as it will hit the front face of the 5th wheel trailer 14. This is the main reason for designing the drop down top center door 11 to make the hook up of 5th wheel trailers easier to accomplished.

Figure 4:
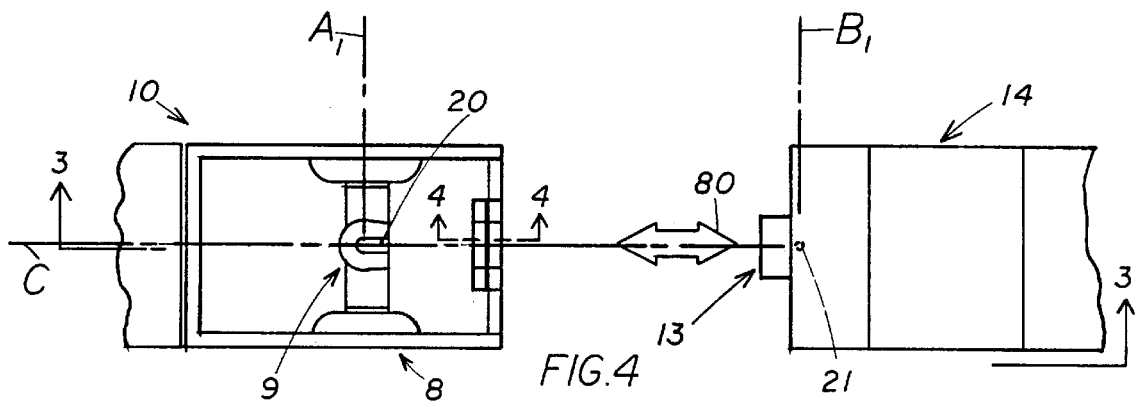
FIG. 4 is a top view showing a fifth wheel trailer hitch aligned with the current invention.
Figure 5:
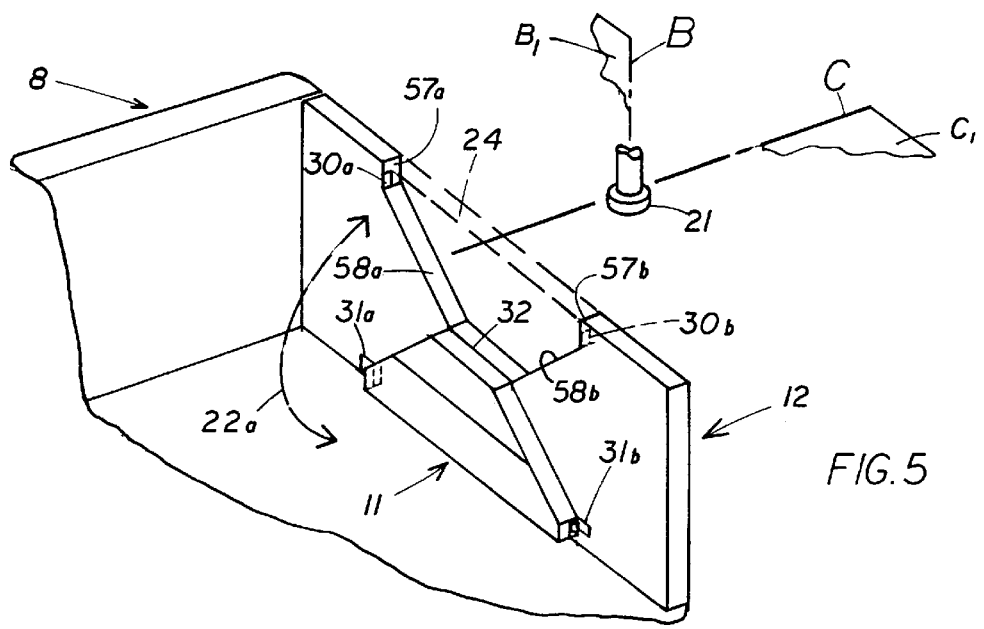
FIG. 5 is a partial perspective view of the tailgate of the current invention as it relates to a hitch pin of a fifth wheel trailer hitch.

FIG. 4 illustrates a partial top view of alignment along axis C to enhance FIG. 3, illustrated by the double arrow 80 with which the pick-up truck 10 can center the receiver hitch 9 to travel along axis C when the pick-up truck 10 is in alignment with the 5th wheel trailer 14 as represented by 3. When this is accomplished the pick-up truck 10 can be backed up to allow hitch pin 21 to pass through opening created when drop down top center door 11 is opened from tailgate 12 and is shown as 4 and is illustrated in FIGS. 2,3, and 5 for clarity. A1 is the center point of the receiver hitch 9 and B1 is the center point of the hitch pin 21 and is the same as illustrated in FIG. 2 for clarity.

FIG. 5 shows a partial perspective view of the drop down top center door 11 in the open position showing hitch pin 21 aligned to pass through opening created when the drop down top center door 11 is lowered into pick-up box 8. The drop down top center door 11 is hinged at the fold over point from tailgate 12 at the connection point in FIG. 5 as 32 and in FIG. 6 for better illustration. The drop down top center door 11 has a stop attached to each end at points numbered 31a and 31b and are bolted to the flat back side of the drop down top center door 11 at the top portion of it that has the pistons locks 18 and 19 of FIG. 8 housed in it as FIG. 8 illustrates and identified in FIG. 9 as item 18, the piston lock assembly. The drop down top center door stops 31a and 31b align the drop down top center door 11 to tailgate 12 when in the closed position as in FIG. 6, and allow piston locks 36a and 36b to enter receptacles 30a and 30b shown in FIG. 5 and FIG. 9. These receptacles 30a and 30b are formed into the flat vertical surfaces at 57a and 57b of tailgate 12 in FIG. 5. The flat surfaces at 57a and 57b, also 58a and 58b are the areas exposed when the drop down top center door 11 is cut into the tailgate 12 exposing the inside of the tailgate 12. Flat sheetmetal is welded to bridge the opening created and to seal the surfaces to give a finished look to the drop down top center door 11 and tailgate 12. Lock receptacles 30a and 30b were cut out of surfaces 57a and 57b to form piston locks 36a and 36b receptacles to allow the piston lock to enter when in the closed position as illustrated in FIG. as 18 and also in FIG. items 18 and 19 showing both sides of drop down top center door 11 in the locked position with tailgate 12.

FIG. 6 shows the inside surface of the tailgate 12 and drop down top center door 11 in the closed position looking from within the pick-up box 8. Shown is the drop down top center door release handle 15 and the drop down top center door stops 31a and 31b as illustrated in FIG. 5, also shown for clarity purposes is drop down top center door hinge numbered as 32 in FIG. 6. Shown is access panel 33 which allows access to tailgate relocated handle 16 and mechanism hook-up illustrated in FIG. 8 to be installed.

FIG. 7 is an elevation view showing for clarity when the tailgate 12 and the drop down top center door 11 are in the closed position as represented as no. 6. Release handle 15 for the drop down top center door 11 and release handle 16 for the tailgate 12 are shown to be centered.

FIG. 8 is a detailed view of both the tailgate 12 operating mechanism and drop down top center door 11 mechanism. To operate release of the drop down top center door 11, release handle 15 is depressed downward toward the bottom of the pick-up box 8 as seen in FIG. 1. The factory handle 15 is installed inside of the tailgate 12 as seen in FIG. 6 and connected to the factory installed mechanism 17 of FIG. 8. After the mechanism 17 was inverted and turned backwards to bolt back to the factory mounting points 49a and 49b of FIG. 9, When handle 15 and mechanism 17 is installed in this position the operation of the drop down top center door 11 can be operated as designed. When handle 15 of drop down top center door 11 is depressed downward toward the pick-up box 8 several actions take place. The downward force applied to handle 15 in FIG. 10 exerts an upward force as the direction arrow 52 in FIG. 10 and shown by the arrows 70 and 71 of FIG. 9 at surfaces 55a and 55b of mechanism 17 which in turn causes angled arms 42 and 43 to pivot at point 44 in the direction of arrows 60 and 61 of FIG. 9 causing lock release rods 39a and 39b which are connected to angle plates 42 and 43 at points 48a and 48b by means of bending the lock release rods 39a and 39b at the ends to form a hook and insert the hook end into holes 48a and 48b. Tension to the mechanism is accomplished by means of the neutral return spring 45 of FIG. 9. When the lock release rods 39a and 39b are moved in the direction of arrows 60 and 61 of FIG. 9, the piston locks are retracted from receptacles 30a and 30b of FIG. 5 and the singular lock 18 of FIG. 9 for clarity this releases the drop down top center door 11 from tailgate 12 as shown in FIG. 11 and when handle 15 of the drop down top center door 11 is released the neutral spring 45 causes the lock release rods 39a and 39b of FIG. 9 to push outwards forcing the piston locks 36a and 36b outwards when this is accomplished the drop down top center door 11 can be lowered in towards the pickup box 8 as illustrated in FIG. 5. The piston lock assemblies 18 and 19 of FIG. 8 are bolted to the inside of the drop down top center door 11 at the points where the piston locks 36a and 36b are shown in FIG. 8. The piston lock assembly 18 as shown in FIG. 9 is for clarity.

The tailgate release handle 16 is relocated to the bottom of the tailgate 12 as shown in FIG. 8 and FIG. 10 and FIG. 11 When an upward force is applied to handle 16 as shown in FIG. 10, as 63, puts a downward force, 64, to the mechanism at point numbered 35 of FIG. 8 and will be known as the neutral pulley. When the neutral pulley 35 is pulled downward it pushes the tailgate latch release cable 40 downward this pulls the factory tailgate mechanism 38a and 38b as shown in FIG. 8. Tension to the latch release cable 40 is accomplished by the turnbuckle 41 which is attached to release cable 40 and factory tailgate latch mechanism 38b by means of a short latch cable. Tension to the latch release cable 40 is adjusted by twisting the turnbuckle to get the tailgate latch mechanism's 38a and 38b of FIG. 8 to release. When the tailgate handle 16 is pulled the latch release cable 40 runs through guide pulley's 34a and 34b and are attached by brackets 37a and 37b of FIG. 8 and FIG. 10. When the downward force exerted at the neutral pulley 35 of FIG. 8 pulls the latch release cable 40 so as to trip release the tailgate latch mechanism's, and allow the tailgate to be lowered to the open position.

We claim and desire to secure by patent application:

1. A fifth wheel trailer hitching system comprising in combination:

a pickup truck having a pickup truck box and a tailgate; and a fifth wheel trailer receiver hitch secured to the pickup truck box;

wherein said tailgate includes an opening in the center of the top edge thereof and a drop down center door which is hinged along a bottom edge thereof to the opening of said tailgate, whereby said door has a first closed position within said cut out portion and a second open position pivoted down into said pickup box to permit a fifth wheel trailer hitch pin to pass through the opening and to be connected to said fifth wheel trailer receiver hitch.

2. The fifth wheel trailer hitching system as defined in claim 1 wherein said door includes a locking arrangement for locking said door in said closed position and a release handle for selectively unlocking said door from said closed position.

3. The fifth wheel trailer hitching system as defined in claim 1 wherein with said door in said open position resistance to air flowing through said pickup truck bed is reduced.

* * * * *